Oct. 23, 1928.
W. L. SCHOENGARTH
1,688,792
ADJUSTABLE GAS ENGINE PISTON
Filed April 9, 1927
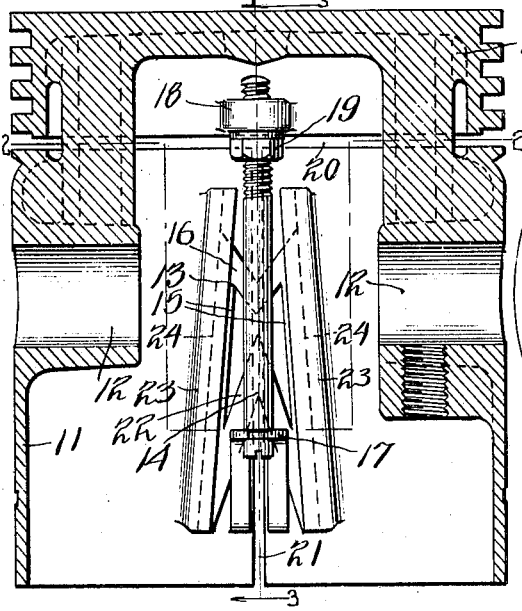
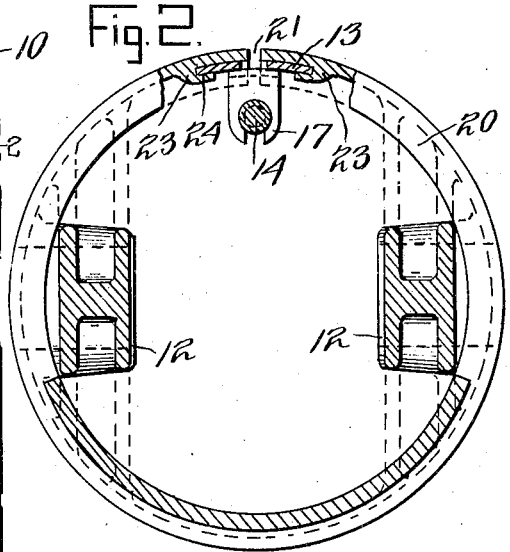
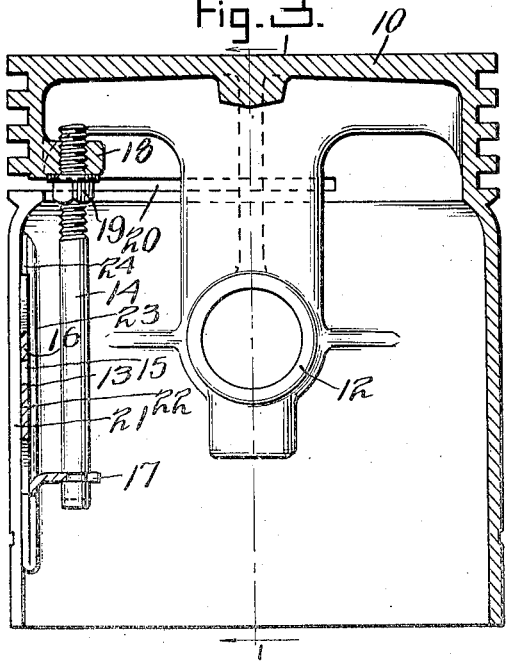
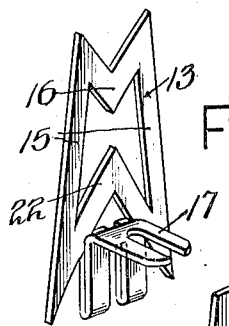
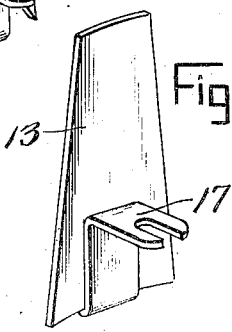
Inventor
Walter L. Schoengarth
By
Attorney Patented Oct. 23, 1928.

1,688,792

UNITED STATES PATENT OFFICE.

WALTER L. SCHOENGARTH, OF HURLEY, WISCONSIN.

ADJUSTABLE GAS-ENGINE PISTON.

Application filed April 9, 1927. Serial No. 182,396.

My invention relates to pistons especially designed for gas engines and to that type wherein the skirt of the piston is made to be adjusted to secure a close fit between the piston and the bore of the cylinder, thus guarding against leakage and providing for maintaining a uniform relationship between the piston and the bore of the cylinder regardless of wear, all as will be hereinafter more fully described and claimed.

Referring to the accompanying drawing, which is made a part hereof and on which similar reference characters indicate similar parts:

Figure 1 is a transverse section through a piston constructed in accordance with my said invention taken on the dotted line 1—1 in Figure 2;

Figure 2, a cross-section on the dotted line 2—2 in Figure 1;

Figure 3, a similar view on the dotted line 3—3 in Figure 1;

Figure 4, a perspective view of an expending wedge by which the adjustment of the piston is secured; and Figure 5, a perspective view of a modified form thereof.

In said drawing, the portion marked 10 indicates the piston head, 11 the skirt, 12 bosses for the crank pin bearings, 13 the adjusting wedge and 14 an adjusting screw by which the position of said wedge is regulated.

The general construction of the piston in so far as the head and skirt are concerned is not materially different from that shown in my former Patent No. 1,174,092, granted March 7, 1916, but the present invention relates more to improvements in details whereby a more efficient operation is secured.

In the present piston a transverse slot 20 is formed in the oil ring groove for about two-thirds more or less of the circumference of the piston and a longitudinal slot 21 extends through the skirt from said horizontal or transverse slot to the bottom of the skirt. On each side of said longitudinal slot I form flanges 23 extending at an angle to each other as best shown in Fig. 1, these flanges having grooves 24 in their adjacent edges in which the edges of the wedge 13 are adapted to fit and slide.

Said wedge 13 is preferably of a skeleton construction shown in Fig. 4, comprising side members 15 for engagement with the groove 24 and angular connecting webs 16 and 22 formed integral therewith and in the manner shown to provide for a slight lateral compression to compensate for the expansion of the piston due to the heat and thereby preventing scoring of the cylinder.

A horizontal ear 17 extends toward the interior of the piston with a bifurcated inner end with which the adjusting screw 14 engages by a circumferential groove under its head.

Said adjusting screw is preferably formed with a circumferential groove adjacent to the head, which fits between the prongs of said bifurcated flange 17. The other end of said adjusting screw is screw-threaded and engages in a screw-threaded boss 18 formed on the side of the piston head and a jamb-nut 19 is mounted adjacent said boss on the under side thereof.

In Fig. 5 is illustrated a form of wedge 13 which is solid or non-yielding. This form of wedge requires very accurate adjustment to be properly set when the piston has expanded.

In use, the skirt, by reason of the horizontal slot cutting through the oil groove for the greater part of its circumference and the longitudinal groove cutting the skirt in two on one side, is made flexible and capable of easy and ready adjustment. The turning of screw 14 will, as will be readily understood, operate through the movement of wedge 13 to expand the skirt to obtain a snug fit between the skirt of the piston and the bore of the cylinder. It will also be seen that as the parts wear a slight turn of screw 14 by a screw driver inserted in the slot in its end will operate to expand the skirt sufficiently to maintain the desired relationship between the parts.

By the special construction of the expanding wedge 13, whereby it is made more or less resilient, the diameter of the skirt becomes within limits automatically adjustable so that if the piston should be too closely adjusted when the motor is cold, it might bind on the cylinder wall unless capable of yielding somewhat to the longitudinal slot, all of which is provided for by this special form of wedge. The wedge therefore becomes a safety device to prevent scoring the wall of the cylinder.

It will be understood, of course, that various modifications may be made in the construction of this device without departing from the spirit of my invention, which is defined only by the scope of the claims.

Having thus fully described my said invention, what I claim as new and desire to secure by Letters Patent, is:

1. A piston comprising a head and skirt, the skirt being formed in piece with the head but substantially severed therefrom by a horizontal slot extending for the greater part of the circumference of the piston, said skirt being formed with another slot extending longitudinally thereof from the transverse slot to the bottom of the skirt and having bearing surfaces formed on each side thereof and extending substantially the length of the skirt, and curved adjusting wedge mounted between said bearing surfaces, substantially as set forth.

2. A piston comprising a head and a skirt, a threaded boss on the head of the piston, said skirt being formed with a longitudinal slot whereby it is adapted to be expanded, bearing surfaces formed on each side of said slot and extending at an angle to each other, a wedge mounted between said bearing surfaces, and an adjusting screw engaging the said wedge and engaging with said threaded boss, whereby the adjustment is effected, substantially as set forth.

3. A piston comprising a head, a skirt formed in piece therewith but partly severed therefrom by a transverse slot adjacent said head and with another slot running longitudinally of the skirt from said transverse slot to the bottom of the skirt, and a resilient wedge adapted to bear between parts of the skirt on opposite sides of the longitudinal slot for adjusting the diameter of said skirt, sustantially as set forth.

4. A piston comprising a head and a skirt, said skirt being formed with a longitudinal slot to permit it to be expanded, a bearing surface on said skirt at each side of said slot, said bearing surfaces being disposed at an angle to each other, an elongated wedge mounted between said bearing surfaces and having a bifurcated flange and an adjusting screw carried by said head and having a slot for the reception of said flange, substantially as set forth.

5. The combination with a longitudinal slotted piston skirt, of a pair of projections mounted on said skirt on opposite sides of the slot and extending longitudinally of the skirt a major portion of its length, and a wedge of a length substantially corresponding to the length of the projections and disposed between the same for adjusting the diameter of the skirt, said wedge being curved to conform to the curvature of the skirt, substantially as set forth.

In witness whereof, I have hereunto set my hand at Hurley, Wisconsin this 7th day of April, A. D. nineteen hundred and twenty-seven.

WALTER L. SCHOENGARTH.